United States Patent
Sullivan et al.

(10) Patent No.: US 10,178,128 B2
(45) Date of Patent: Jan. 8, 2019

(54) METHODS AND APPARATUSES FOR ENABLING HSTS POLICY FOR A SUBDOMAIN OF A DOMAIN

(71) Applicant: CLOUDFLARE, INC., San Francisco, CA (US)

(72) Inventors: Nicholas Thomas Sullivan, San Francisco, CA (US); Rajeev Devendra Sharma, San Francisco, CA (US); Ryan Lackey, San Francisco, CA (US); Zi Lin, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 109 days.

(21) Appl. No.: 14/967,156

(22) Filed: Dec. 11, 2015

(65) Prior Publication Data
US 2017/0171247 A1    Jun. 15, 2017

(51) Int. Cl.
| G06F 17/00 | (2006.01) |
| H04L 29/06 | (2006.01) |
| H04L 29/08 | (2006.01) |
| H04L 29/12 | (2006.01) |

(52) U.S. Cl.
CPC .......... *H04L 63/20* (2013.01); *H04L 61/1511* (2013.01); *H04L 63/0281* (2013.01); *H04L 63/166* (2013.01); *H04L 67/02* (2013.01)

(58) Field of Classification Search
CPC .................................................. H04L 63/0281
See application file for complete search history.

(56) References Cited

U.S. PATENT DOCUMENTS

| 8,271,636 B2* | 9/2012 | L'Heureux ......... H04L 67/2804 709/217 |
| 8,683,193 B1* | 3/2014 | Hansen .................... H04L 29/06 713/153 |
| 8,799,482 B1* | 8/2014 | Stamos ............... H04L 29/0809 709/227 |

(Continued)

OTHER PUBLICATIONS

Hodges et al. "HTTP Strict Transport Security (HSTS)". Internet Engineering Task Force (IETF), Request for Comment 6797, Nov. 2012, pp. 1-46.*

(Continued)

*Primary Examiner* — John B King
*Assistant Examiner* — Darshan I Dhruv
(74) *Attorney, Agent, or Firm* — Nicholson De Vos Webster & Elliott LLP

(57) ABSTRACT

A method and apparatus for enabling an HSTS policy for a subdomain of a domain is described. A request for content at a subdomain of a domain is received at a proxy server from a client device over a secure transport. The proxy server determines whether the subdomain is associated with a rule indicating that Hypertext Transport Protocol Strict Transport Security (HSTS) is to be enabled for the subdomain of the domain. Responsive to determining that the subdomain is associated with the rule, the proxy server transmits, to the client device, a first response that includes an HSTS header and which instructs the client device to communicate only over the secure transport for requests for content at the subdomain, wherein the first response includes the HSTS header regardless of whether HSTS has been enabled for the subdomain at an origin server.

9 Claims, 5 Drawing Sheets

(56) References Cited

U.S. PATENT DOCUMENTS

| | | | |
|---|---|---|---|
| 8,990,357 B2 * | 3/2015 | Graham-Cumming | ............... H04L 67/2828 707/709 |
| 9,049,244 B2 * | 6/2015 | Prince | ................. H04L 67/2814 |
| 9,083,727 B1 * | 7/2015 | Stamos | ................. H04L 63/126 |
| 2010/0011420 A1 * | 1/2010 | Drako | ................. G06Q 10/107 726/5 |
| 2010/0281265 A1 * | 11/2010 | Ogawa | .................... G06F 21/10 713/176 |
| 2014/0195645 A1 * | 7/2014 | Cohen | .................... H04L 67/32 709/219 |
| 2014/0250296 A1 * | 9/2014 | Hansen | .................. H04L 29/06 713/151 |
| 2015/0229481 A1 * | 8/2015 | Prince | ................ H04L 63/0823 713/175 |
| 2016/0094575 A1 * | 3/2016 | Shekyan | ............. G06F 17/3089 726/25 |

OTHER PUBLICATIONS

Hodges et al., "HTTP Strict Transport Security (HSTS)", Internet Engineering Task Force (IETF), Request for Comments: 6797, Nov. 2012, pp. 1-46.

\* cited by examiner

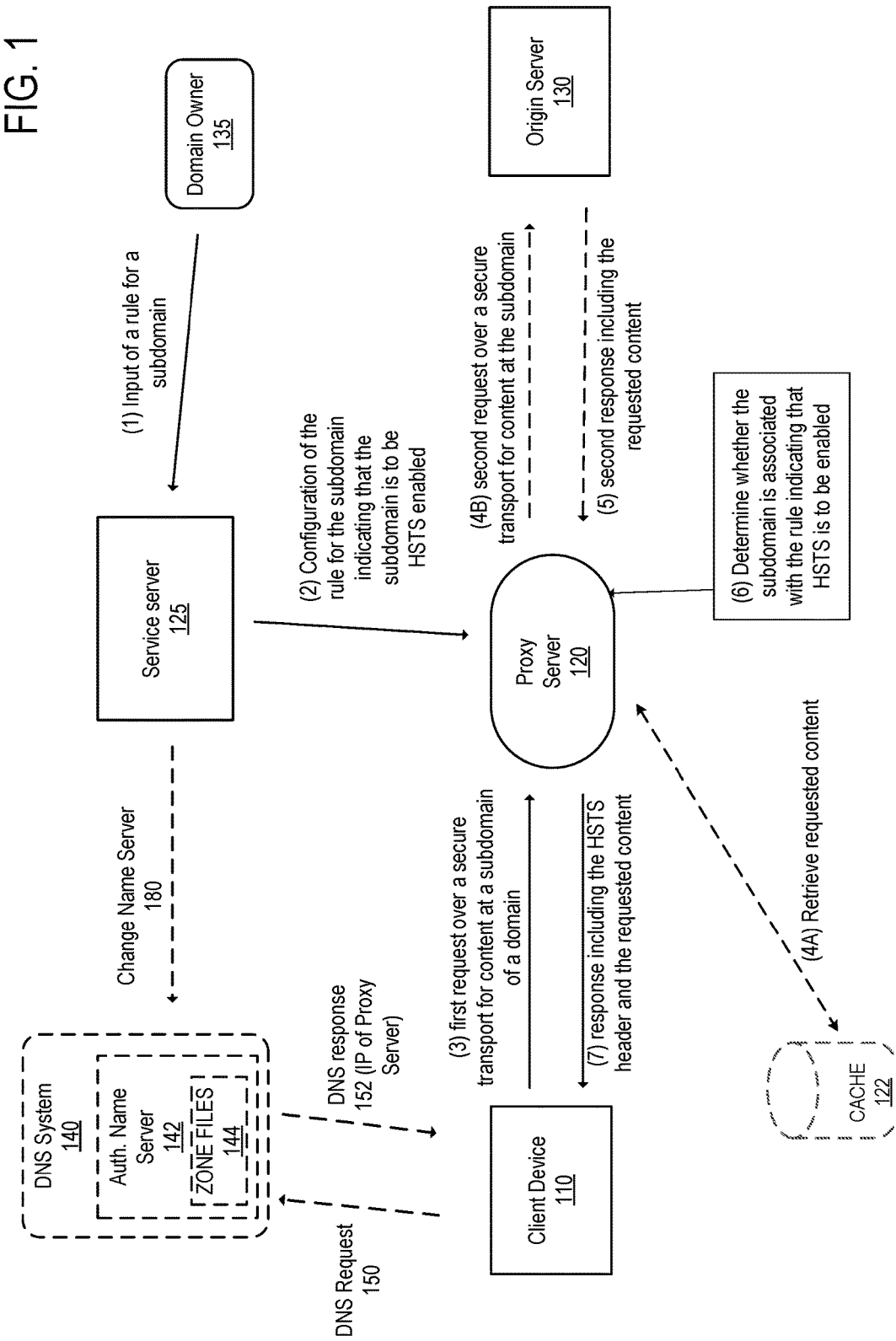

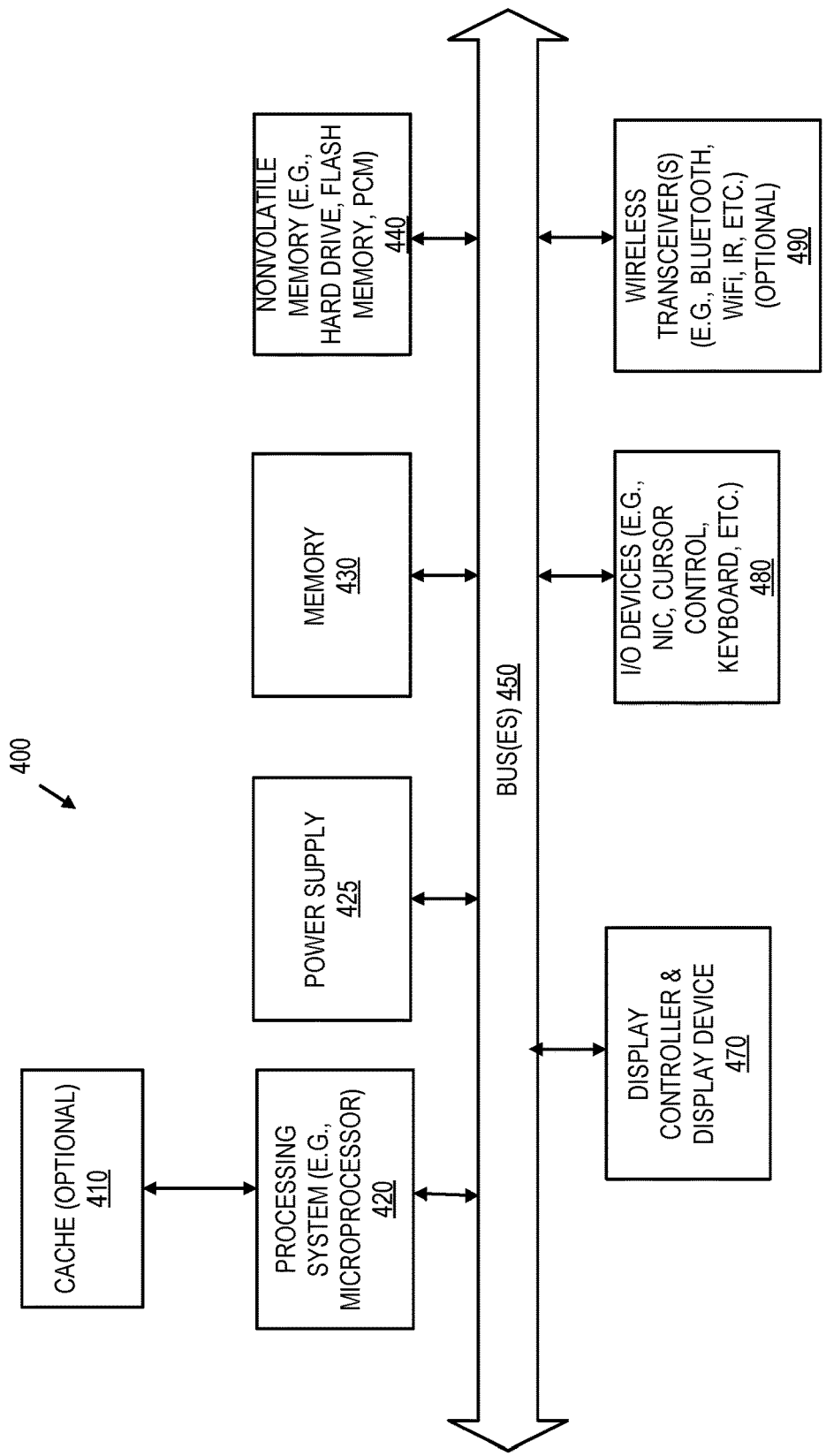

METHODS AND APPARATUSES FOR ENABLING HSTS POLICY FOR A SUBDOMAIN OF A DOMAIN

FIELD

Embodiments of the invention relate to the field of network services; and more specifically to enabling HTTP Strict Transport Security policy for a subdomain of a domain.

BACKGROUND

HTTP Strict Transport Security (HSTS) is a web security policy mechanism, which helps to protect secure websites against downgrade attacks and cookie hijacking. It enables web servers to request that web clients (e.g., web browsers or other complying user agents) only connect to the web servers using secure connections (e.g., via Hypertext Transport Protocol Secure (HTTPS)), and never via an insecure protocol such as Hypertext Transport Protocol (HTTP). HSTS is an Internet Engineering Task Force (IETF) standards track protocol and is specified in the Request for Comments RFC 6797, "HTTP Strict Transport Security (HSTS)".

A HSTS policy is enabled on a host via the transmission from the host of a Strict-Transport-Security HTTP response header field over a secure transport (e.g., TLS, or SSL) to client devices (e.g., the user agents of web applications running on the client devices) that access the hostname. The HSTS Policy directs the client devices to communicate with the host only over secure transport and it specifies a policy retention time duration (e.g., a number of seconds, after the reception of the HSTS header filed, during which the client device is to consider the host as an HSTS host (i.e., the client device can communicate with the host only through the secure transport protocol during this period of time)).

RFC 6797 defines that the HSTS Policy may contain an optional directive "includeSubDomains," which specifies that the HSTS policy also applies to any hosts whose domain names are subdomains of the HSTS host's domain name. Using this conventional approach, a domain administrator, Alice, may enable an HSTS policy on an apex (root) domain (e.g., 'example.com') with 'includeSubDomains' with the objective of having all the connections to *.example.com (i.e., to any subdomain of "example.com") established through a secure protocol (e.g., HTTPS). However, this conventional approach has various shortcomings and limitations. In fact, an HSTS host may offer unsecured HTTP-based services on alternate ports or at various subdomains of its HSTS Host domain name In addition, distinct web applications are offered at distinct subdomains of the HSTS Host, such that web clients often interact directly with these subdomain web applications without having necessarily interacted with a web application offered at the HSTS Host's domain name. If the client devices do not connect to the host domain (e.g., 'example.com'), they never receive an HSTS header for that host domain and never learn that HSTS is to be enabled for the domain as well as for all its subdomains. In this case, the client devices continue to visit the subdomain(s) (e.g., www.example.com) through an unsecure protocol (e.g., HTTP).

In the conventional approaches, in order to ensure that a subdomain (e.g., a frequent subdomain) is also HSTS enabled, the domain administrator is advised to further configure the subdomain to enable HSTS as well. The exemplary subdomain "www.example.com", or other popular endpoints (such as "api.example.com," etc.) are also configured to enable an HSTS policy for that subdomain at the server hosting the subdomain, in addition to the host domain (e.g., "example.com" being HSTS enabled). Therefore in these conventional approaches there is a tedious duplicate configuration for enabling a HSTS policy on a domain and its subdomain. One may understand that this approach will have to be repeated for each subdomain for which the domain administrator would like to enable an HSTS policy.

BRIEF DESCRIPTION OF THE DRAWINGS

The invention may best be understood by referring to the following description and accompanying drawings that are used to illustrate embodiments of the invention. In the drawings:

FIG. 1 illustrates an exemplary architecture of an Internet-based proxy service according to some embodiments of the invention;

FIG. 4 is a block diagram illustrating an exemplary computer system according to some embodiments of the invention.

DETAILED DESCRIPTION

Figure 2A:
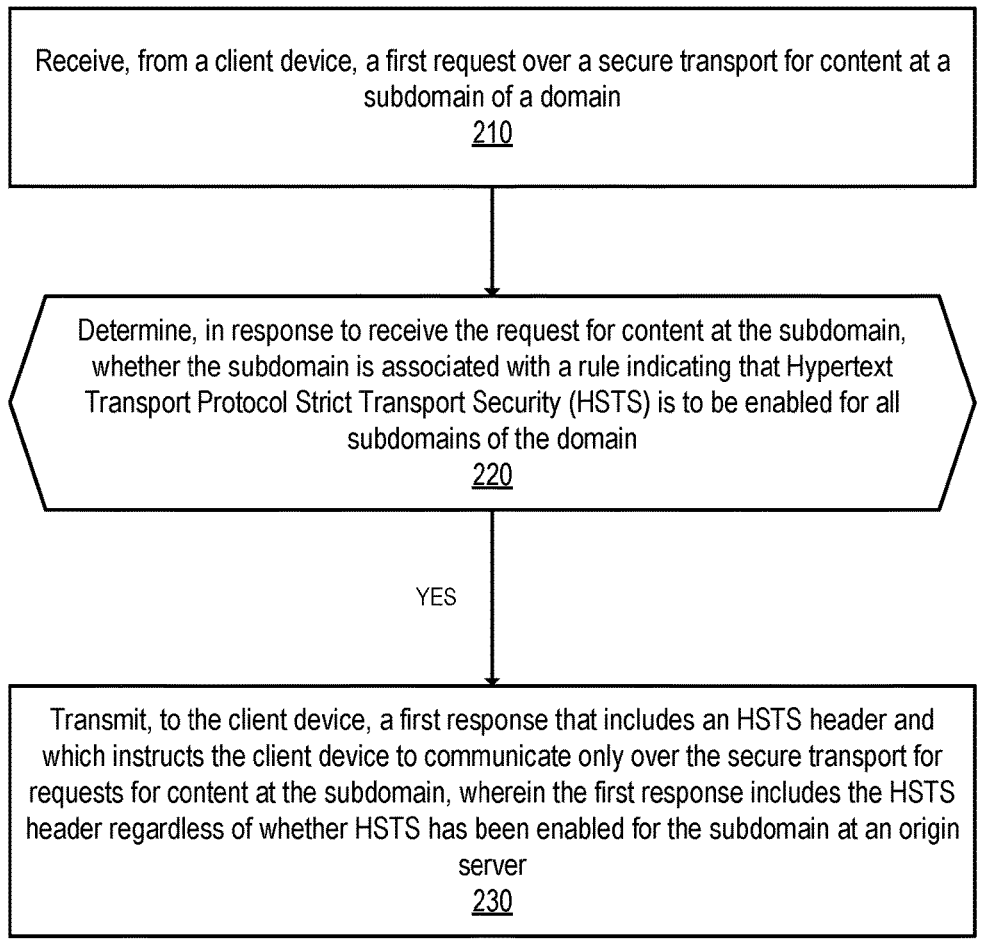
FIG. 2A is a flow diagram illustrating exemplary operations for enabling an HSTS policy for a subdomain of a domain according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Methods and apparatuses for enabling HSTS policy for subdomains of a domain as part of Internet-based proxy service (hereinafter "service") is described in an embodiment. The service, which is available over the Internet and may not require customers (e.g., owners of a domain and/or personnel working on behalf of domain owner) to install hardware or software, allows customers (e.g., owners of a domain) to enable an HSTS policy that may be applicable to multiple subdomains of a domain. In an embodiment, unlike other products that require installation of hardware or software, the service (in particular enabling HSTS policies) described herein exists at the network level (and thus does not require customers to install hardware or software). For example, the customer (e.g., domain administrator/owner) may define through the service a rule for enabling HSTS on subdomains of a domain. The rule is configured to be applied at a proxy server, which automatically enables the HSTS policy for a domain and all its subdomains based on this rule regardless of whether a subdomain is HSTS enabled at the origin server.

In some embodiments, customers change their authoritative name server to an authoritative name server of the service, and also change the IP address(es) that resolve to their origin server(s) (which hosts content of their domain) to point to a proxy server of the service. In other embodiments, customers of the service change individual DNS records to point to a proxy server (or point to other domain(s) that point to a proxy server of the service). For example, the customers may change their DNS records to point to a CNAME that corresponds with a proxy server of the service. Regardless of the embodiment, requests from visitors for actions to be performed on identified resources of the customer's domain and subdomains are received at the proxy server.

In an embodiment, the proxy server receives, from a client device, a request over a secure transport protocol for content at a subdomain of a domain (e.g., a request over HTTP for "www.example.com"). The proxy server determines whether the subdomain is associated with a rule indicating that HSTS is to be enabled. Upon determining that the subdomain is associated with the rule, the proxy server transmits to the client device, a response that includes an HSTS header and which instructs the client device to communicate only over a secure transport for requests for content at the subdomain regardless of whether HSTS has been enabled for the subdomain at an origin server. In an embodiment, prior to transmitting the first response to the client device, the proxy server transmits the request for content to the origin server hosting the subdomain, and receives a response from the origin server that includes the requested content, where the response received from the origin server does not include the HSTS header. The proxy server includes the HSTS header in the response with the requested content and transmits it to the client device.

FIG. 1 illustrates an exemplary architecture of the service according to one embodiment of the invention. The domain owner 135 is a customer of the service and registers their respective domain and subdomains for the service. For example, the authoritative name servers for each domain of the domain owner 135 may be changed to the authoritative name server 142 of the service at operation 180. It should be understood that the backup authoritative name server serving the domain may also be changed to an authoritative name server of the service. The zone file (e.g., in zone files 144) record for the domain is also changed such that DNS resolution requests for the domain owned by the domain owner 135, which corresponds with the origin server 130, resolve to the proxy server 120. In one embodiment, a customer (e.g., the domain owner 135 or other entity (e.g., web administrators) on behalf of the domain owner 135) may use the service server 125 to change their authoritative name server to the authoritative name server 142 and change their zone file to have their domain point to the service proxy server (herein after "proxy server") 120.

The service server 125, operated by the service, provides a set of tools and interfaces for the domain owner 135 and is accessible over the Internet. For example, the service server 125, among other things, allows the domain owner 135 to register for the service, view statistics/logs of events, and report suspicious events. The service server 125 includes tools to assist the domain owner 135 in changing their authoritative name servers and zone file record. It should be understood, however, that the domain owner 135 may change their authoritative name server and zone file without use of the service server 125 (i.e., they may directly change the authoritative name server and zone file). The service server 125 may be used by the domain owner/administrator 135 to set up an HSTS rule indicating that an HSTS policy is to be enabled for a subdomain. In an exemplary embodiments, the domain owner may access a user interface to provide an input (1) that indicates that HSTS is to be applied to a domain (e.g., "example.com") and its subdomains. In these embodiments, the service server 125 is operative to configure (2) one or more proxy servers (e.g., proxy server 120) to enable an HSTS policy for the domain and all its subdomains. Thus, regardless of whether a subdomain is HSTS enabled at the origin server 130, a domain owner 135 can configure a rule to enable an HSTS policy on one or more subdomains by performing a single configuration at the servicer server 125.

The DNS system 140 is used to refer to the DNS system as a whole and includes multiple DNS servers to resolve DNS requests. As illustrated, the DNS system 140 includes the authoritative name server 142, which is an authoritative name server for the service. Thus, the authoritative name server 142 is the authoritative name server for the domains corresponding to the origin server 130. Accordingly, when the DNS system 140 resolves a request 150 for a domain or a subdomain corresponding to the origin server 130, the authoritative name server 142 provides the authoritative answer 152. It should be understood that the DNS system 140 includes more DNS servers (e.g., preferred domain servers, top-level domain name servers, other domain servers) than illustrated. It should also be understood that there may be multiple authoritative web servers for the service and they may be geographically distributed.

The client device 110 is a computing device (e.g., laptop, workstation, smartphone, palm top, mobile phone, tablets, gaming system, set-top box, wearable device, etc.) that is capable of accessing network resources. For example, the client device 110 may include software such as web applications (e.g., web browsers, mobile applications, etc.) that are capable of accessing network resources. A user at the client device 110 requests network resources (e.g., HTML pages, images, word processing documents, PDF files, movie files, music files, data object documents, etc.) through a client network application such as a web application (e.g., web browser, mobile web application, etc.) or other application (e.g., FTP client, SSH client, Telnet client, etc.). The client device is operative to transmit over a secure transport protocol (e.g., Secure Sockets Layer (SSL), or Transport Layer Security (TLS) etc.) a request for content at a subdomain of a domain.

The origin server 130 is a computing device that serves network resources (e.g., HTML pages, images, word processing documents, PDF files, movie files, music files, data object documents (e.g., JSON documents, XML documents) or other computer files). The origin server 130 responds to requests for network resources (e.g., from an HTTP request, HTTPS request, FTP request, telnet request, etc.). Although not illustrated in FIG. 1, it should be understood that the network resources of the origin server 130 may be stored separately from the device that responds to the requests. In some embodiments, an HSTS policy is not enabled at the origin server 130 for the apex domain and/or each subdomain of the apex domain.

The proxy server 120 is a computing device that is situated between the client device 110 and the origin server 130 and provides features of the service. Certain network traffic passes through the proxy server 120 (traffic sent from the client devices 110 and/or traffic sent from the origin server 130). Web traffic (e.g., HTTP requests/responses, HTTPS request/responses, SPDY requests/responses, etc.) for domain(s) serviced by the origin server 130 may be received and processed at the proxy server 120. As will be described in greater detail later herein, the proxy server 120 is operative to receive a request (3) for content at a subdomain of a domain serviced by the origin server 130 over a secure transport; determine (4) whether the subdomain is associated with a rule indicating that HSTS is to be enabled for that subdomain; and is further operative to transmit an HSTS header field (5) for enabling an HSTS policy for a subdomain of a domain upon receipt of a request, from the client device 110, for content at that subdomain In some embodiments, the proxy server 120 may also provide additional services such as participation in a content delivery network by providing cached files of the origin server 130 (through the cache 122); providing cached copies of files (if available) of the origin server 130 during periods when they are offline (e.g., through the cache 122); restricting access to the origin server 130 (which may be based on a set of one or more factors such as the characteristics of the requester, the type of request, and the content of the request); and scanning the traffic (sent from a client device 110 and/or sent from an origin server 130) for vulnerabilities (e.g., virus, worm, etc.) and acting accordingly (e.g., blocking the request, alerting the sender and/or receiver of the vulnerability, throttling the connection to slow down the request, etc.).

While FIG. 1 illustrates a single proxy server 120, in some embodiments the service has multiple proxy servers that are geographically distributed. For example, in some embodiments, the service uses multiple point of presences (POPs). A POP is a collection of networking equipment (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP.

While FIG. 1 illustrates a single origin server 130 and a single client device 110 respectively coupled with the proxy server 120, in some embodiments the proxy server is coupled with multiple origin servers and/or with multiple client devices. Moreover, in some embodiments, there are multiple proxy servers providing service for a particular domain.

The owner of the proxy server 120 may be different than the owner of the origin server 130. In addition, the proxy server 120 is not typically part of the local network of the origin server 130. For example, the proxy server 120 is outside of the local area network of the origin server 130 and is typically not physically accessible by the owner/administrator of the origin server 130.

In some embodiments, the client device 110 makes a request over a secure transport protocol (3) for content at a subdomain of a domain (e.g., an HTTPS GET request, or other request for content at subdomain "www.example.com" of domain "example.com"). The proxy server 120 analyzes the request (3) and determines (4) whether the subdomain "www.example.com" is associated with a rule indicating that HSTS is to be enabled for this subdomain. In one embodiment, responsive to determining that the subdomain is associated with the rule, the proxy server 120 automatically includes an HSTS header in a response, which instructs the client device to enable an HSTS policy for that subdomain. The HSTS policy causes the client device 110 to communicate only over a secure transport protocol with the origin server 130 hosting the subdomain and the HSTS header is included in the response regardless of whether an HSTS policy is enabled at the origin server 130 for that subdomain. It should be understood that the response may also include the requested content (or network resource). The proxy server retrieves the requested content and includes it in the response along with the HSTS header.

In an embodiment, the proxy server 120, responsive to receiving the request for content at the subdomain, determines whether a cached copy of the requested content is present at the proxy server (e.g., in the cache 122). If the cached copy is present, the proxy server 120 retrieves (4A) the content and includes it in the response to be transmitted to the client device 110. In an embodiment, the cached copy also includes a cached copy of an HSTS header, and upon determining that the received request is associated with the rule indicating that HSTS is to be enabled for this subdomain, the cached HSTS header is added to the response along with the cached requested content. In an alternative embodiment, the cached copy of the requested content does not include a cached HSTS header and the proxy server adds the HSTS header. The HSTS header is transmitted with the cached copy of the content in a response to the response including the cached copy of the content to be transmitted to the client device.

In another embodiment, the cached copy of the requested content is not present at the proxy server 120 and prior to transmitting the response with the HSTS header to the client device 110, the proxy server 120 transmits (4B) the request for content to the origin server 130. The proxy server 120 receives a response (5) from the origin server 130 that includes the requested content. The response may or may not include an HSTS header. Since the requested content has a subdomain that matches the HSTS rule, the proxy server 120 includes the HSTS header in a response and transmits it to the client with the requested content received from the origin server 130. Thus, the proxy serve 120 may modify the response received from the origin server 130 to add an HSTS header prior to transmitting the response to the requesting client device 110.

In some embodiments, the secure communication established between the client device 110 and the origin server 130 following the enablement of the HSTS policy is performed through the proxy server 120. While in other embodiments, this secure communication may be established without passing through the proxy server 120.

The operations in the flow diagram of FIGS. 2A, 2B and 3 will be described with reference to the exemplary embodiments of the FIG. 1. However, it should be understood that the operations of the flow diagrams can be performed by embodiments of the invention other than those discussed with reference to the FIG. 1, and the embodiments of the invention discussed with reference to these other figures can perform operations different than those discussed with reference to the flow diagrams.

Figure 2B:
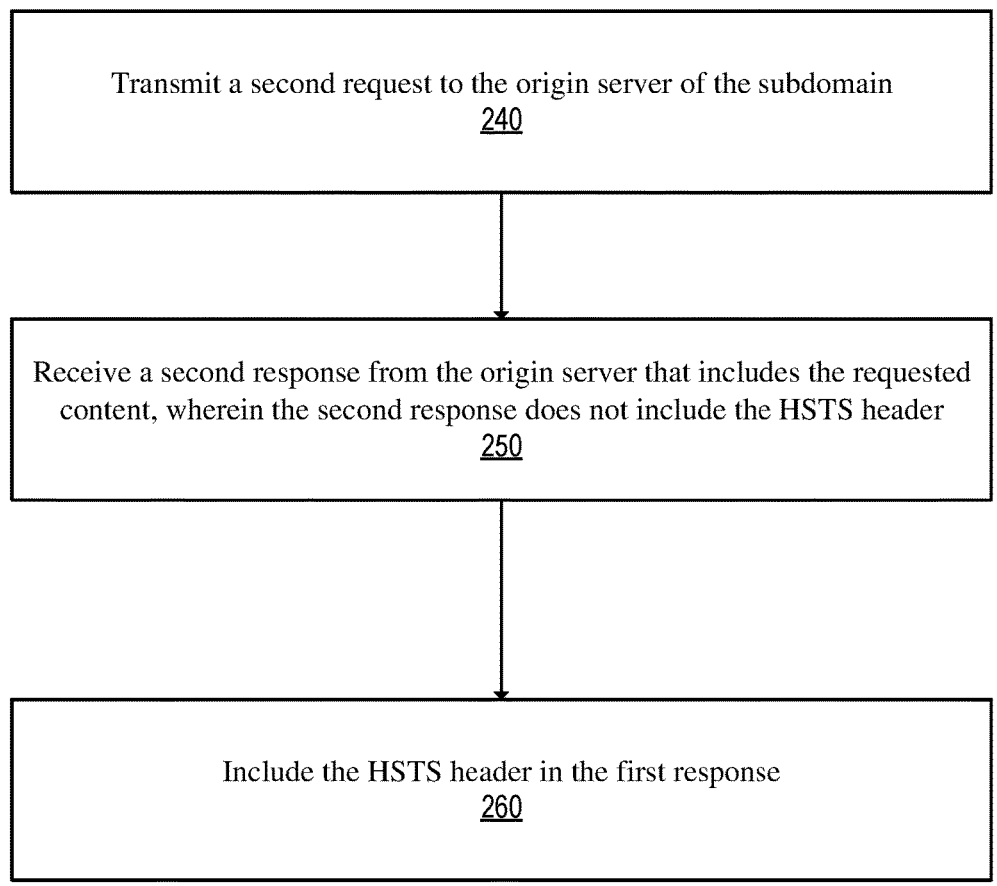
FIG. 2B is a flow diagram illustrating exemplary operations for enabling an HSTS policy for a subdomain of a domain according to one embodiment of the invention.

FIGS. 2A, 2B are flow diagrams illustrating exemplary operations for enabling an HSTS policy at a subdomain of a domain according to some embodiments. At block 210, the proxy server 120 receives, from the client device 110, the request (3) (e.g., an HTTP GET) over a secure transport protocol (e.g., over SSL, or TLS) for content at a subdomain of a domain (e.g., subdomain "www.example.com" of domain "example.com."). Flow moves from block 210 to block 220 where the proxy server 120 determines, in response to receiving the request for content at the subdomain, whether the subdomain is associated with a rule indicating that HSTS is to be enabled. In some embodiments, the rule is configured at the service server 125 and applied to the proxy server 120. In some embodiments, this configuration is performed according to operations described with reference to FIG. 3 below. Flow then moves to block 230, at which the proxy server 120, in response to determining that the subdomain is associated with the rule, transmits to the client device, a response that includes an HSTS header, which instructs the client device 110 to make requests for the subdomain only over a secure transport connection. The response includes this HSTS header regardless of whether HSTS has been enabled for the subdomain at the origin server 130. In some embodiments, the response is transmitted over a secure transport protocol such as SSL or TSL. In some embodiments, upon determining that the request is not associated with a rule indicating that HSTS is to be enabled, the request is transmitted to the origin server 130 (not illustrated).

In an embodiment, prior to transmitting the response including the HSTS header to the client device 110, the proxy server 120 transmits a second request to the origin server 130 of the subdomain (as illustrated at block 240 of FIG. 2B). Flow then moves from block 240 to block 250 at which the proxy server 120 receives a second response from the origin server 130 that includes the requested content, wherein the second response does not include the HSTS header. Flow then moves to block 260 at which the proxy server 120 includes the HSTS header in the response transmitted to the client device.

In another embodiment, prior to transmitting the response including the HSTS header to the client device 110, the proxy server 120 retrieves the requested content from a cache (e.g., cache 122) to be transmitted in the response. The cache 122 may include the requested content as well as a cached copy of the HSTS header. In an embodiment, the cache 122 does not include a cached copy of the HSTS header. The cached content and the HSTS header as added to the response transmitted from the proxy server 120 to the client device 110.

Figure 3:
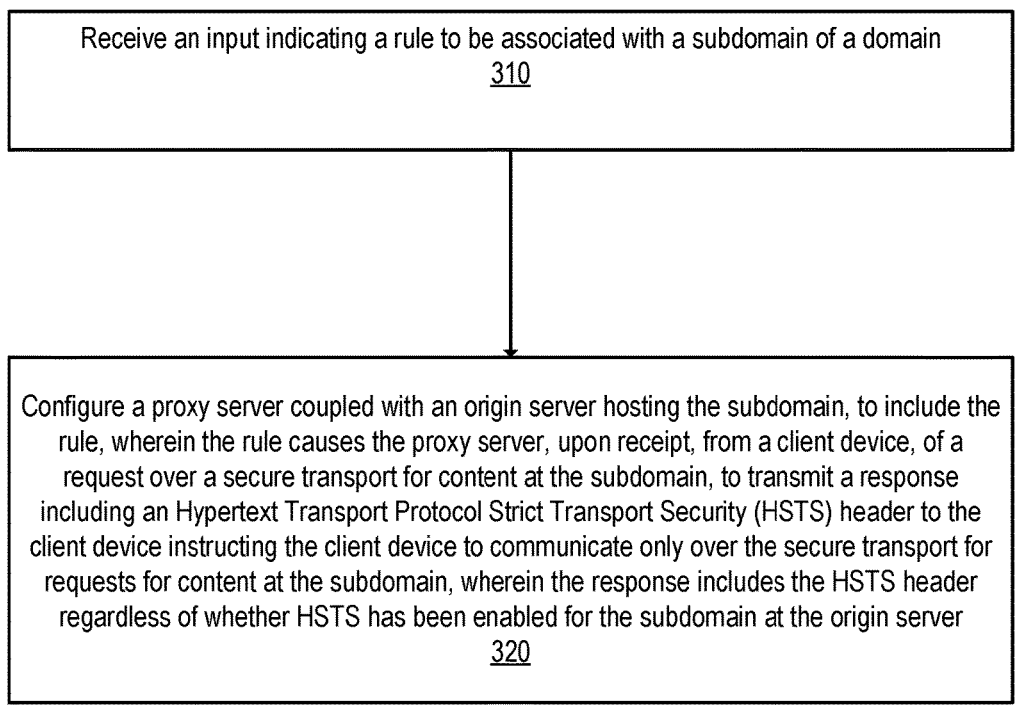
FIG. 3 is a flow diagram illustrating exemplary operations for configuring a proxy server to enable an HSTS policy for a subdomain of a domain in accordance with some embodiments of the invention.

FIG. 3 is a flow diagram illustrating exemplary operations for configuring a proxy server to enable an HSTS policy for a subdomain of a domain in accordance with some embodiments. In some embodiments, a domain administrator/owner 135 may provide an input through a user interface of a rule for enabling HSTS for a subdomain. In some exemplary embodiments, the domain owner 135 selects the domain associated with the subdomain (e.g., selecting the domain "example.com") for which an HSTS policy is to be applied. The selection may be performed through a user interface on the service server 125 (e.g., through a drop down menu, by typing a name of the domain etc.). The domain owner 135 may further select parameters of the HSTS policy (e.g., the time period for which this policy is to be applied). In an embodiment, in order to enable HSTS at the subdomain (or at all subdomains of the domain), the domain owner 135 performs a single configuration operation by selecting the domain for which the rule is to be applied. In another embodiment, the domain owner 135 may input a selection criterion identifying a subset of all subdomains for which an HSTS policy is to be enabled (e.g., the subset of subdomains may be all subdomains starting with "www.").

Thus, the service server receives, at block 310, the input indicating the rule to be associated with the subdomain of the domain (e.g., the rule may include a selection criterion identifying all subdomains or a subset of all subdomains of the domain). Flow then moves to block 320 at which the service server 125 configures a proxy server (e.g., proxy server 120) coupled with the origin server 130 hosting the subdomain, to apply the rule. The rule causes the proxy server 120, upon receipt over a secure transport of a request for content at the subdomain, to transmit a response including an Hypertext Transport Protocol Strict Transport Security (HSTS) header to the client device instructing the client device to communicate only over the secure transport for requests for content at the subdomain regardless of whether HSTS has been enabled at the origin server. Thus once it is configured with the rule indicating that the subdomain of the domain is to be HSTS enabled, the proxy server automatically transmits the HSTS header with the proper parameters (previously configured by the domain owner) upon receipt of a request for content at that subdomain and the HSTS header is included in the response regardless of whether the subdomain is HSTS enabled at the origin server.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

The embodiments described herein provide methods and systems for allowing a host administrator to enable an HSTS policy on a domain and its subdomains with a one-stop configuration while removing the need for multiple configurations (e.g., through the configuration of each subdomain individually) consequently ensuring that the HSTS policy is applied to all matching subdomains. Thus in the embodiments described herein a proxy server automatically transmits HSTS headers to client devices from which traffic is received for subdomains of a domain name when the subdomain matches a preconfigured rule regardless of whether HSTS is enabled at the origin server hosting the subdomains.

As illustrated in FIG. 4, the computer system 400, which is a form of a data processing system, includes the bus(es)

450 which is coupled with the processing system 420, power supply 425, memory 430, and the nonvolatile memory 440 (e.g., a hard drive, flash memory, Phase-Change Memory (PCM), etc.). The bus(es) 450 may be connected to each other through various bridges, controllers, and/or adapters as is well known in the art. The processing system 420 may retrieve instruction(s) from the memory 430 and/or the nonvolatile memory 440, and execute the instructions to perform operations described herein. The bus 450 interconnects the above components together and also interconnects those components to the display controller & display device 470, Input/Output devices 480 (e.g., NIC (Network Interface Card), a cursor control (e.g., mouse, touchscreen, touchpad, etc.), a keyboard, etc.), and the optional wireless transceiver(s) 490 (e.g., Bluetooth, WiFi, Infrared, etc.). In one embodiment, the client device 110, the service server 125, the proxy server 120, and/or the origin servers 130 can take the form of the computer system 400.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server for enabling a Hypertext Transport Protocol Strict Transport Security (HSTS) policy at a subdomain of a domain, the method comprising:
   receiving, from a client device, a first request over a secure transport for content at the subdomain of the domain, wherein the first request is destined to an origin server hosting the subdomain and the HSTS policy is not enabled at the origin server for the domain and not enabled for the subdomain of the domain;
   determining, in response to receiving the first request for content at the subdomain, whether the subdomain is associated with a rule indicating that the HSTS policy is to be enabled for a plurality of subdomains of the domain, wherein the plurality of subdomains is less than all subdomains of the domain, and wherein the rule results from a single configuration operation specified through a user interface for the plurality of subdomains of the domain and is to be uniformly applied to the plurality of subdomains while removing a need for performing a plurality of configurations separately applied for the plurality of subdomains;
   transmitting, from the proxy server, a second request to the origin server of the subdomain;
   receiving, from the origin server, a second response from the origin server that includes the requested content, wherein an HSTS header is absent from the second response; and
   responsive to determining that the subdomain is associated with the rule, transmitting, to the client device, a first response that includes the HSTS header that instructs the client device to communicate only over the secure transport for requests for content at the subdomain, wherein the first response includes the HSTS header regardless of whether the HSTS policy has been enabled for the subdomain at the origin server, and wherein the first response includes the requested content received in the second response from the origin server.

2. The method of claim 1, wherein the rule is configured through a service server coupled with the proxy server.

3. The method of claim 1, wherein the first request for content is received at the proxy server as a result of a DNS (Domain Name System) request for the subdomain resolving to the proxy server instead of the origin server.

4. A proxy server for enabling a Hypertext Transport Protocol Strict Transport Security (HSTS) policy at a subdomain of a domain, the proxy server comprising:
   a non-transitory computer readable storage medium to store instructions; and
   a hardware processor coupled with the non-transitory computer readable storage medium to process the stored instructions to:
      receive, from a client device, a first request over a secure transport for content at a subdomain of a domain, wherein the first request is destined to an origin server hosting the subdomain and the HSTS policy is not enabled at the origin server for the domain and not enabled for the subdomain of the domain;
      determine, in response to receiving the first request for content at the subdomain, whether the subdomain is associated with a rule indicating that the HSTS policy is to be enabled for a plurality of subdomains of the domain, wherein the plurality of subdomains is less than all subdomains of the domain, and wherein the rule results from a single configuration operation specified through a user interface for the plurality of subdomains of the domain and is to be uniformly applied to the plurality of subdomains while removing a need for performing a plurality of configurations separately applied for the plurality of subdomains;
      transmit, from the proxy server, a second request to the origin server of the subdomain;
      receive, from the origin server, a second response from the origin server that includes the requested content, wherein an HSTS header is absent from the second response; and
      responsive to determining that the subdomain is associated with the rule, transmit, to the client device, a first response that includes the HSTS header that instructs the client device to communicate only over the secure transport for requests for content at the subdomain, wherein the first response includes the HSTS header regardless of whether the HSTS policy has been enabled for the subdomain at the origin server, and wherein the first response includes the requested content received in the second response from the origin server.

5. The proxy server of claim 4, wherein the rule is configured through a service server coupled with the proxy server.

6. The proxy server of claim 4, wherein the request for content is received at the proxy server as a result of a DNS (Domain Name System) request for the subdomain resolving to the proxy server instead of the origin server.

7. A non-transitory computer readable storage medium that provide instructions, which when executed by a processor of a proxy server for enabling a Hypertext Transport Protocol Strict Transport Security (HSTS) policy at a subdomain of a domain, cause said processor to perform operations comprising:

receiving, from a client device, a first request over a secure transport for content at a subdomain of a domain, wherein the first request is destined to an origin server hosting the subdomain and the HSTS policy is not enabled at the origin server for the domain and not enabled for the subdomain of the domain;

determining, in response to receiving the first request for content at the subdomain, whether the subdomain is associated with a rule indicating that the HSTS policy is to be enabled for a plurality of subdomains of the domain, wherein the plurality of subdomains is less than all subdomains of the domain, and wherein the rule results from a single configuration operation specified through a user interface for the plurality of subdomains of the domain and is to be uniformly applied to the plurality of subdomains while removing a need for performing a plurality of configurations separately applied for the plurality of subdomains;

transmitting, from the proxy server, a second request to the origin server of the subdomain;

receiving, from the origin server, a second response from the origin server that includes the requested content, wherein an HSTS header is absent from the second response; and responsive to determining that the subdomain is associated with the rule, transmitting, to the client device, a first response that includes the HSTS header and that instructs the client device to communicate only over the secure transport for requests for content at the subdomain, wherein the first response includes the HSTS header regardless of whether the HSTS policy has been enabled for the subdomain at the origin server, and wherein the first response includes the requested content received in the second response from the origin server.

8. The non-transitory computer readable storage medium of claim 7, wherein the rule is configured through a service server coupled with the proxy server.

9. The non-transitory computer readable storage medium of claim 7, wherein the request for content is received at the proxy server as a result of a DNS (Domain Name System) request for the subdomain resolving to the proxy server instead of the origin server.

\* \* \* \* \*